Oct. 30, 1951  P. L. THURSTON  2,573,117
ARTICLE OF HOSIERY
Filed Jan. 8, 1949  10 Sheets-Sheet 2
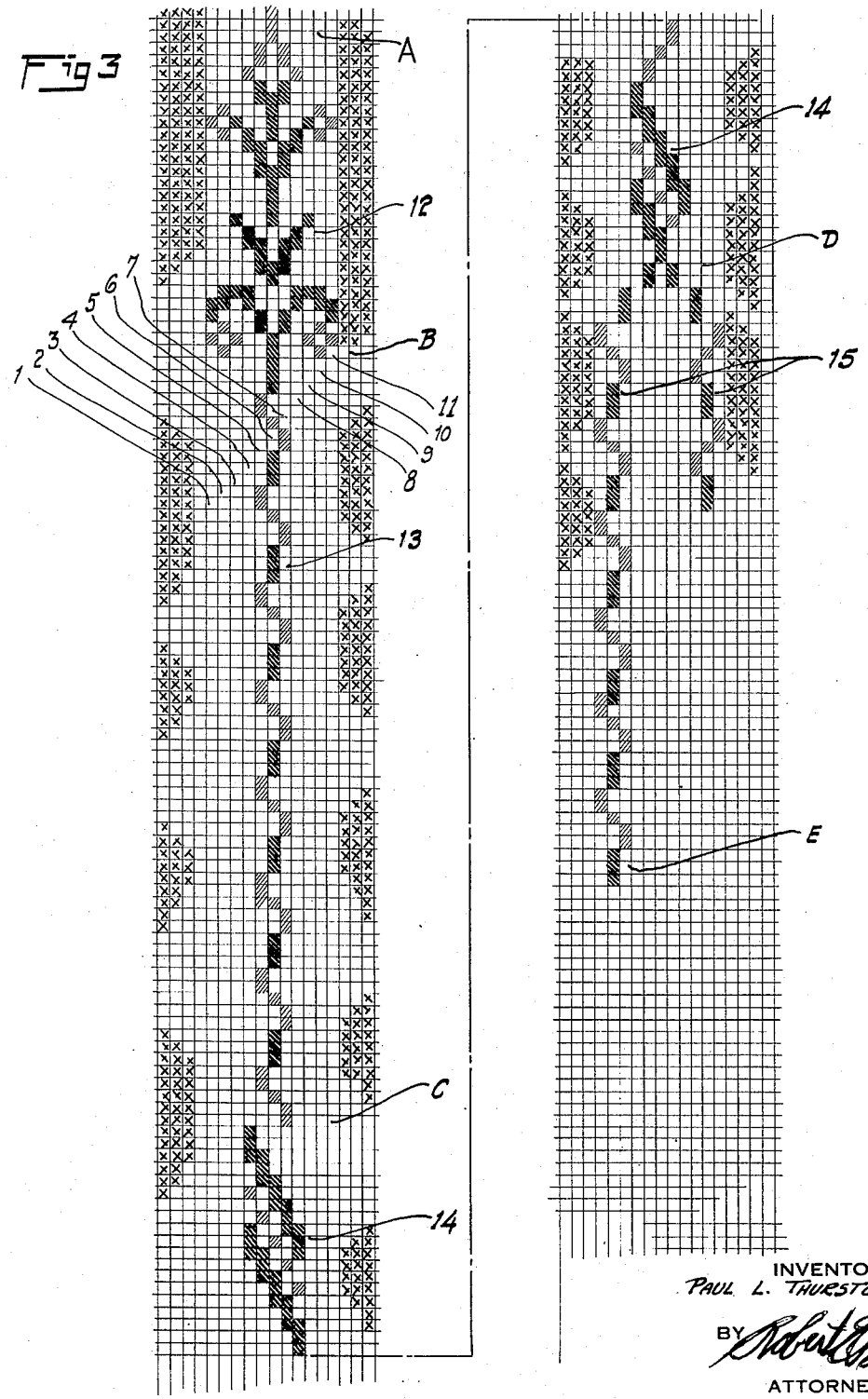

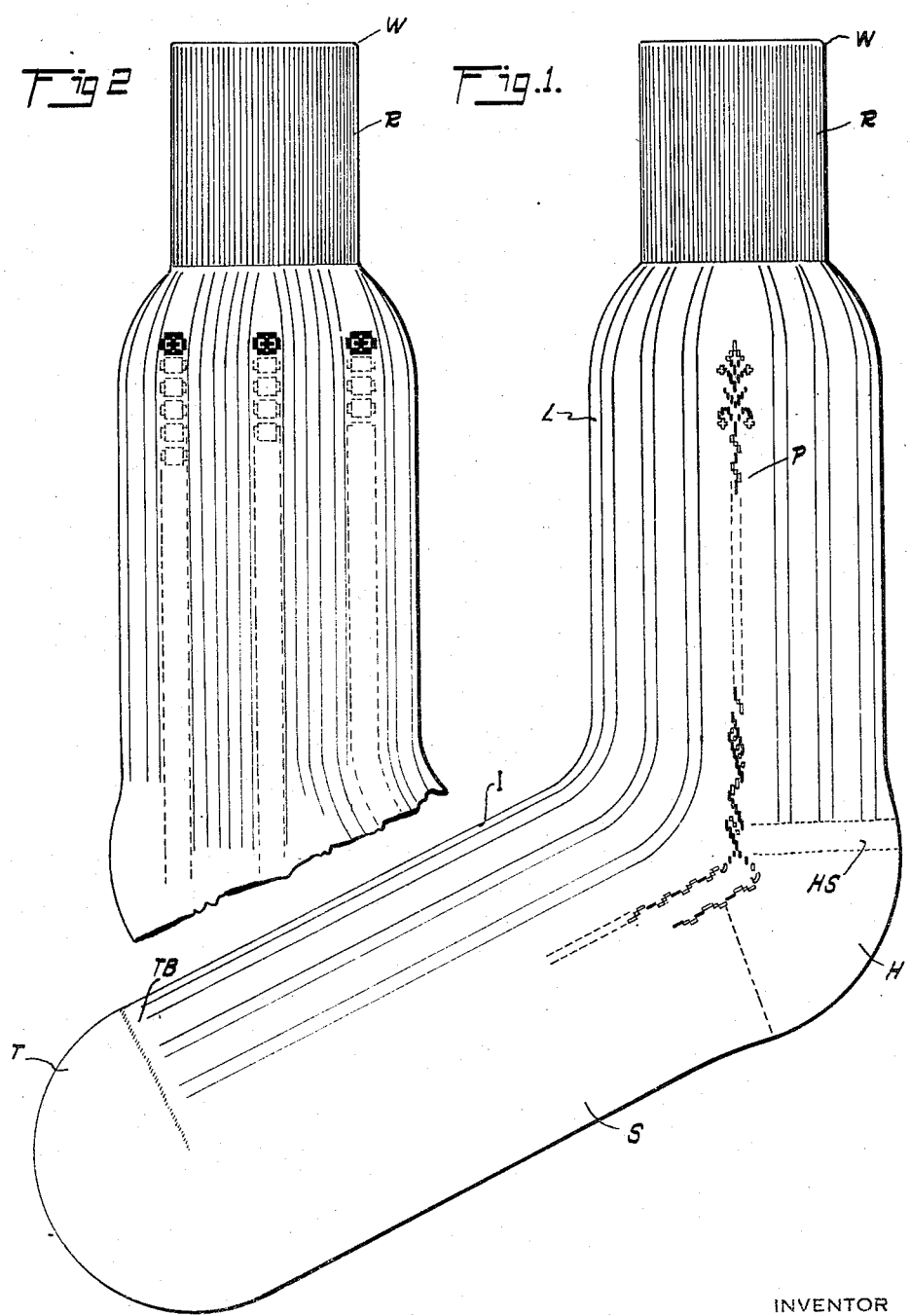

Oct. 30, 1951     P. L. THURSTON     2,573,117
ARTICLE OF HOSIERY
Filed Jan. 8, 1949     10 Sheets-Sheet 3
Fig 4
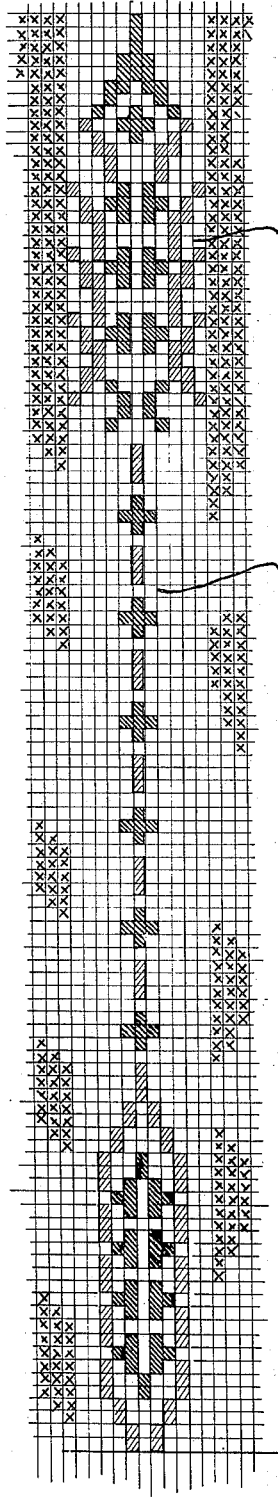
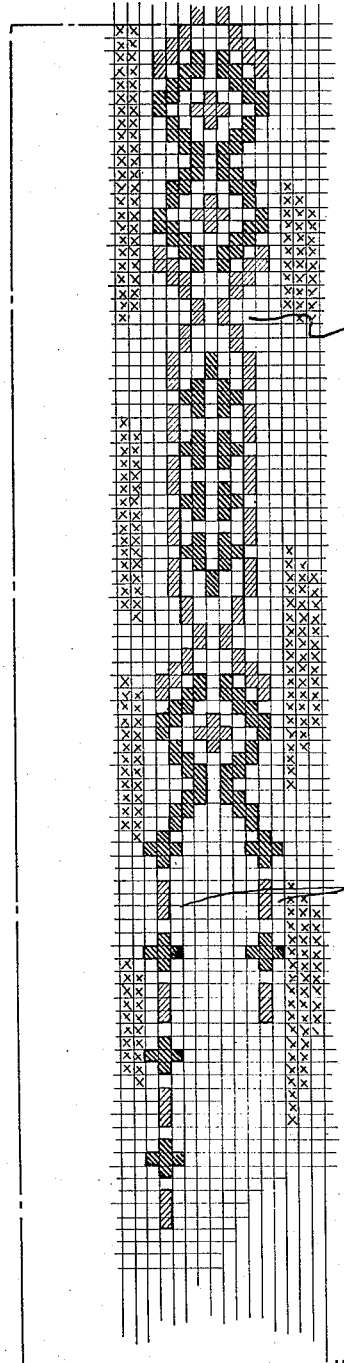
INVENTOR
PAUL L. THURSTON
ATTORNEY Oct. 30, 1951           P. L. THURSTON           2,573,117
ARTICLE OF HOSIERY Filed Jan. 8, 1949                                      10 Sheets-Sheet 4

INVENTOR
PAUL L THURSTON
BY
ATTORNEY

Oct. 30, 1951 P. L. THURSTON 2,573,117
ARTICLE OF HOSIERY
Filed Jan. 8, 1949 10 Sheets-Sheet 5

INVENTOR
PAUL L. THURSTON
BY
ATTORNEY

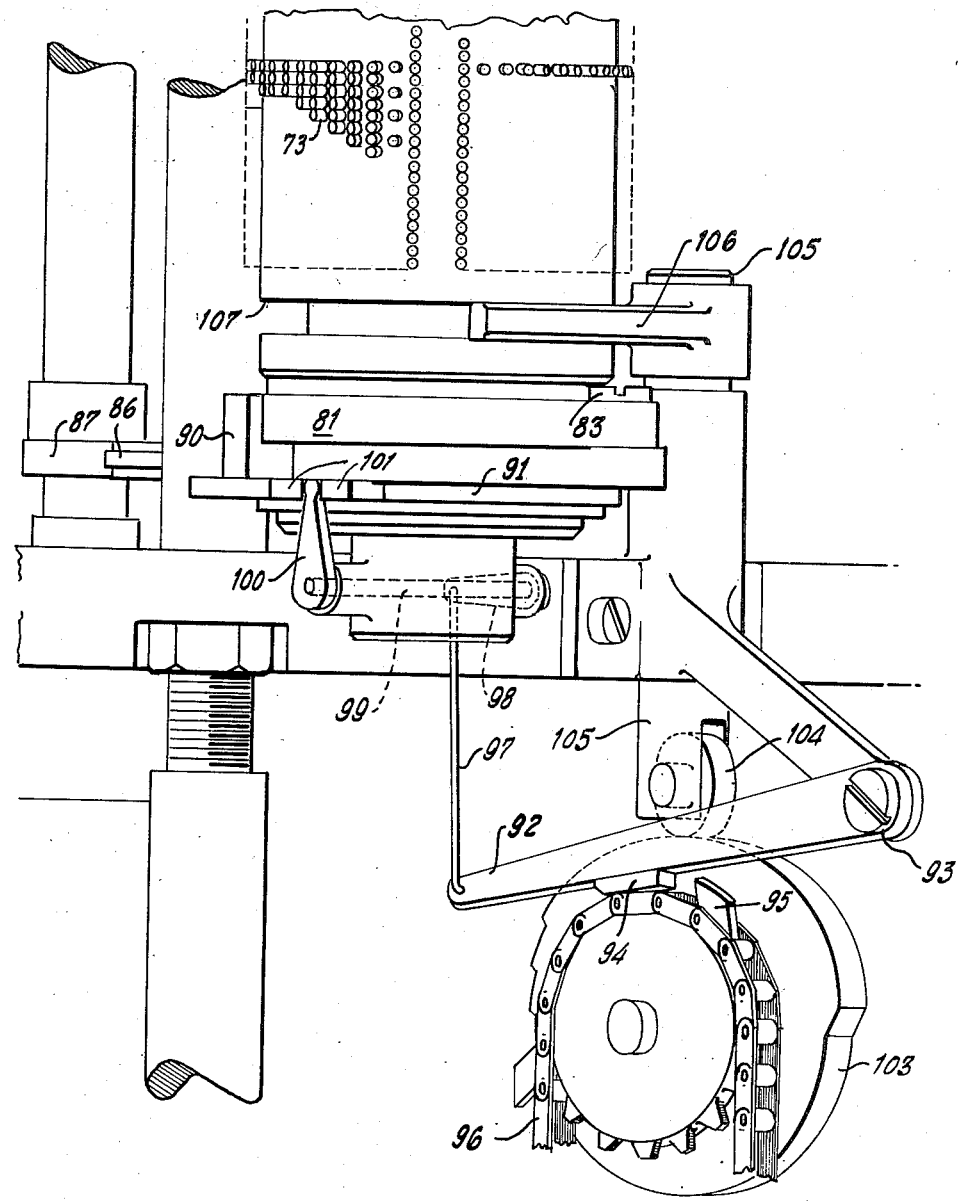

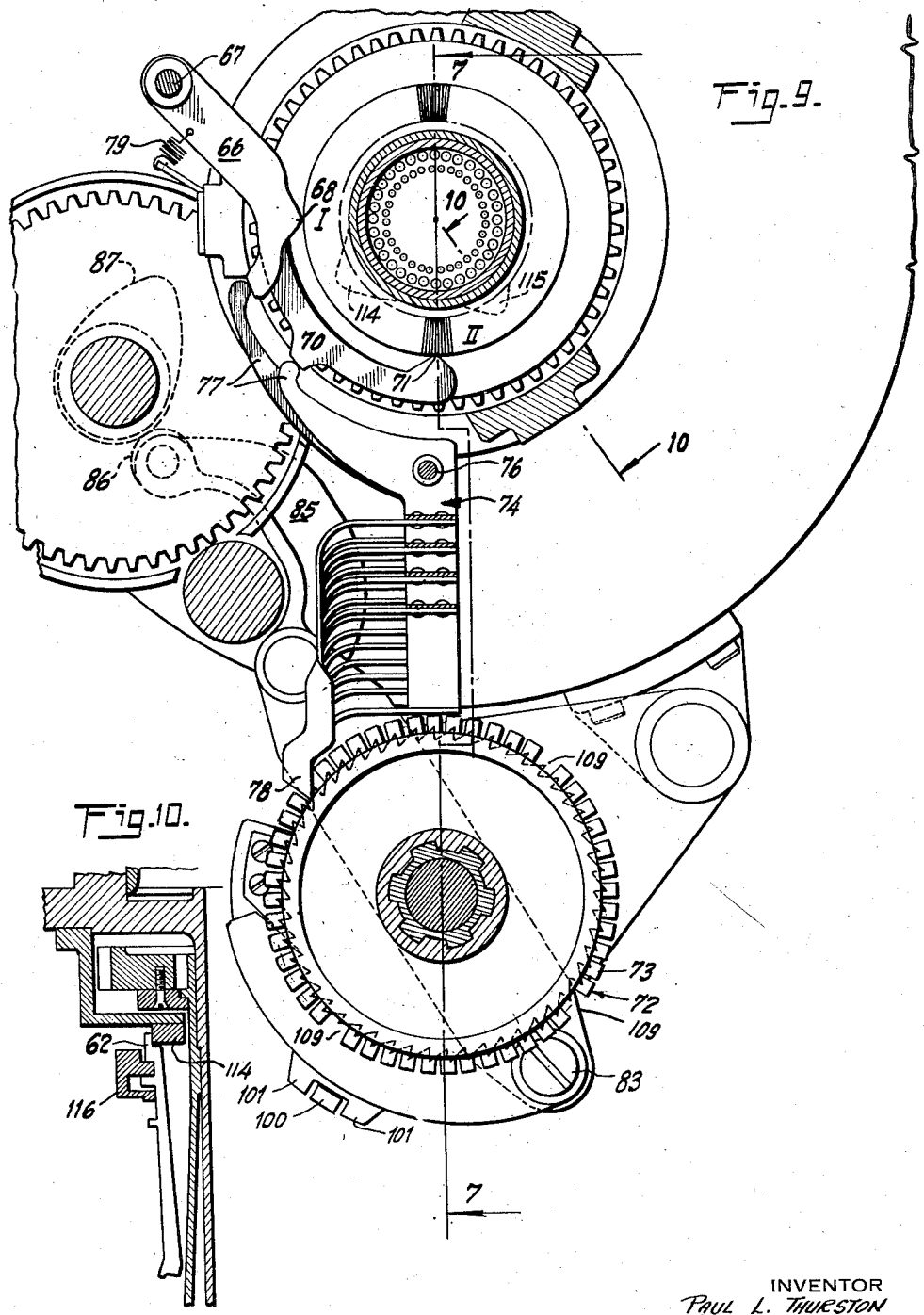

Oct. 30, 1951 P. L. THURSTON 2,573,117
ARTICLE OF HOSIERY
Filed Jan. 8, 1949 10 Sheets-Sheet 8

INVENTOR
PAUL L. THURSTON
BY
ATTORNEY

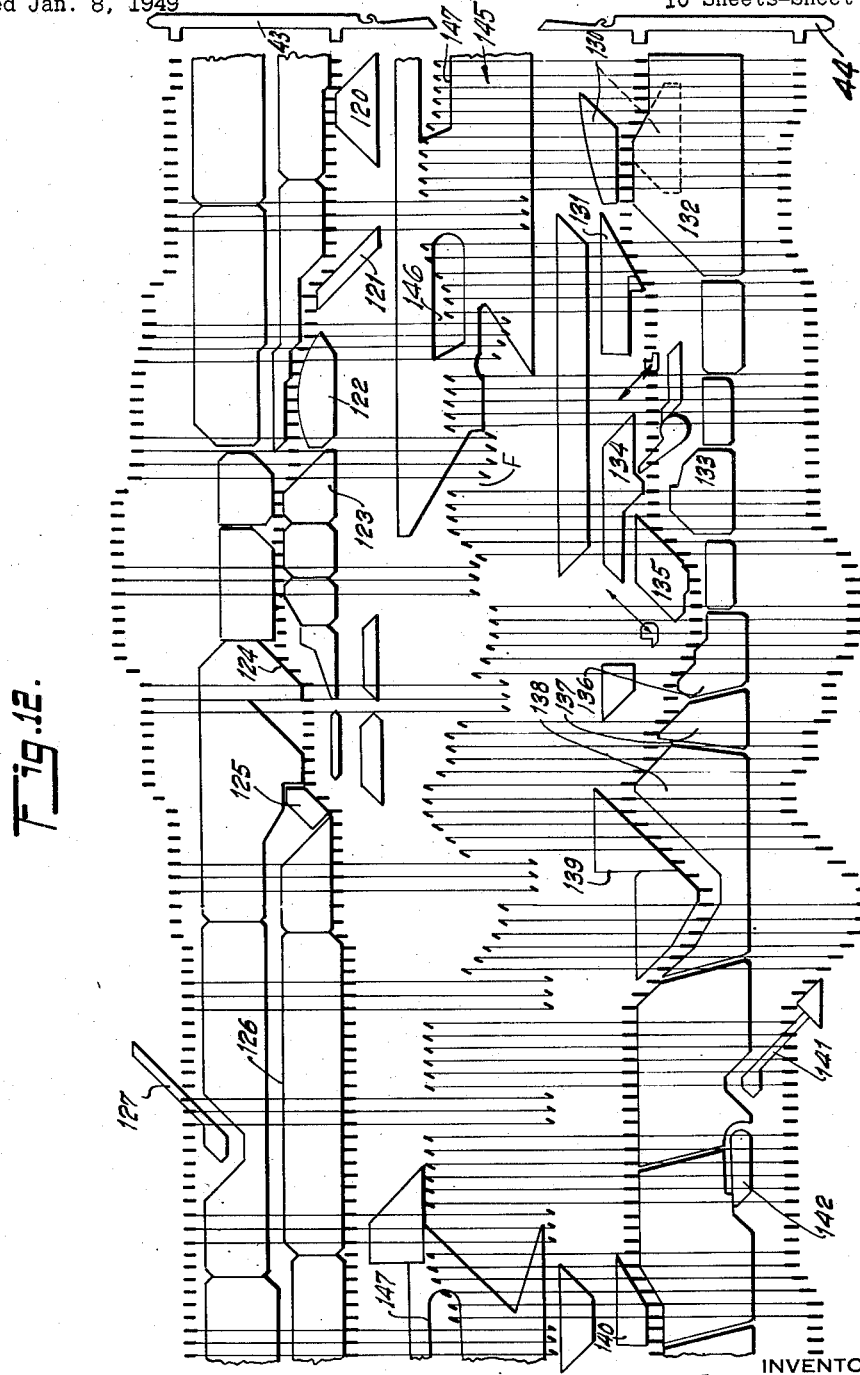

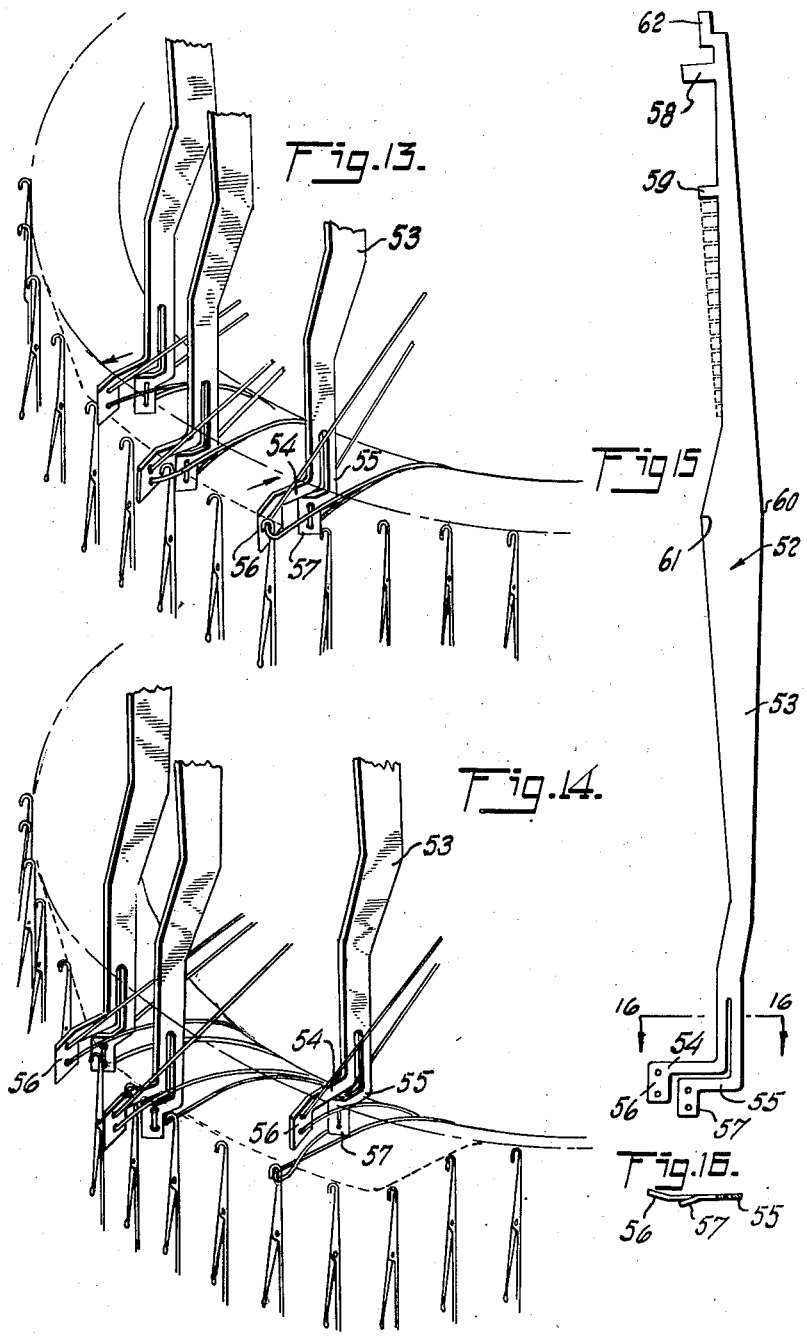

Patented Oct. 30, 1951

2,573,117

UNITED STATES PATENT OFFICE 2,573,117

ARTICLE OF HOSIERY

Paul L. Thurston, Martinsburg, W. Va., assignor to Interwoven Stocking Company, New Brunswick, N. J., a corporation of New Jersey Application January 8, 1949, Serial No. 69,961

7 Claims. (Cl. 66—180)

The present invention relates to the production of multi-color wrap embroidery rib-knit fabric on circular knitting machines including circular knitting machines having co-axial superposed needle cylinders with needles operable in either cylinder and selectively transferable from one cylinder to the other. A particular application of the invention is the production of a color-within-color wrap embroidery patterns in the rib-knit leg and instep portion of tubular seamless articles of hosiery, such as half-hose.

The circular knitting machine herein described forms the subject matter of my divisional application, filed December 16, 1949 and bearing Serial No. 133,291.

In producing knitted fabric wih a wrap embroidery pattern, the body of the fabric is knit of thread or yarn—usually called the body yarn—which forms the background for the design. At selected stitches of the fabric, a wrap embroidery thread or yarn is knit in plating relation over the body yarn so as to come to the outside face of the fabric. By using a wrap thread of different color from the body thread, a pleasing multi-color pattern or design can be produced. The wrap thread usually extends in a generally walewise direction, being floated from one course in which it is incorporated to the next.

The production of simple wrap embroidery patterns in knitting plain fabric on a single series of needles is relatively easy, various machines having been employed for this purpose. The problem is more difficult with seamless rib-knit fabric. In order to make rib fabric, it is necessary to have a second series of needles which draw stitches in the opposite direction. Stitches which are drawn by one series of needles so that the needle loops come to the outer face of the fabric are referred to as outwardly facing stitches, while stitches which are drawn by the other series of needles so that the needle loops come to the inner face of the fabric are called inwardly facing stitches. In a circular knitting machine for producing rib fabric, the needles of one series are slidably disposed in slots in a tricked cylinder while needles of the other series are carried by a dial or a second needle cylinder which is disposed above, and co-axial with, the first. In either case, the dial or the second needle cylinder occupies the space which in a plain knitting machine is used for the wrap embrodiery mechanism and the presence of the needles of the second series interfers with the wrapping of needles of the first series. The problem is still more difficult in a seamless hosiery machine where the small diameter of the cylinder limits the space available and mechanism required for producing a welt or selvage at the upper edge, a top portion of one type of rib fabric, leg and instep portions of another type of rib fabric, reciprocatorily knit heel and toe pockets and plain knit sole and toe band portions puts a premium on all available space.

While wrap embroidery mechanism for coaxial cylinder rib knitting machines has been previously proposed, as illustrated by Kent U. S. Patent No. 2,065,469 and Holmes U. S. Patent No. 2,358,640, the scope of patterns that could be produced by such mechanism has been limited. Where, for example, embroidery thread has been fed to successive needles of a group of needles by means of corresponding wrap thread guides, it has been necessary either to feed the same wrap thread to the same needle throughout or else to shift or shog all of the thread guides relative to the needles so that different wrap threads are supplied to all of the needles. In other words, it has not been possible independently to change the wrap thread fed to one needle while continuing to feed the original wrap threads to adjacent needles. These limitations have restricted the patterning possibilities of the mechanism.

To maintain leadership in the hosiery field, it is necessary continually to bring out new and attractive designs and patterns each successive season. The designs are customarily first drawn by artists and then sent to the knitting mill where machines are set up to produce them. It is obviously desirable for the machines to be able to produce whatever designs are drawn. By reason of the limitations referred to above, this has not been possible with the machines heretofore available.

It is an object of the present invention materially to increase the patterning possibilities of multi-color wrap embroidery patterns on rib-knit seamless fabric, particularly in seamless hosiery such as half-hose. In accordance with the invention, the color of the wrap thread in any needle wale can be changed wholly independently of the color in adjacent wales. This makes it possible to produce a wide variety of multi-color wrap embroidery patterns. It is, for example, possible, in accordance with the present invention, to produce true color-within-color patterns, i. e., patterns in which there is one color above and also beneath another color in the same needle wale and also one color on either or both sides of another color in the same course. Thus, a cross or other design of one color may be completely surrounded by a design of another color. Likewise, it is possible to have one color at all wales of a group of consecutive wales in one course or group of courses and to have another color at the same wales in the next course or group of courses. Innumerable other patterns can likewise be produced by the greatly increased patterning possibilities that are now opened up. With the present invention it is possible to produce virtually any two-color wrap embroidery pattern that can be drawn.

In accordance with the present invention, a plurality of wrap embroidery yarns extend in a walewise direction along each of a plurality of successive needle wales of rib-knit fabric and are knit alternatively at selected stitches of their respective wales. By knitting one or another of the wrap yarns allocated to each needle wale, the color of the wale can be changed from stitch to stitch as desired wholly independently of the wrapping of adjacent wales. The independent control of color in each of a plurality of successive wales of the fabric makes possible an almost unlimited number of attractive patterns.

The novel fabric structure in accordance with the present invention can be produced on a circular knitting machine having coaxial superposed needle cylinders, double-ended needles operable selectively in either cylinder, means for feeding body thread to the needles and means for actuating the needles to take and knit the thread. Each of selected needles that are to receive wrap thread is provided with a plurality of wrap thread guides which are operably supported by a carrier inside of, and rotatable with, the upper needle cylinder. Mechanism is provided for selectively actuating the needles and the thread guides to feed one or another of the wrap threads to the respective selected needles in accordance with a predetermined sequence to produce the desired pattern. In the embodiment herein shown and described, one thread guide is operable to feed one wrap thread to a needle at one wrapping station and another thread guide is operable at a second wrapping station to feed a different wrap thread to the same needle. Thus, each of the selected needles may be wrapped at either, both, or neither of said stations in accordance with the particular design that is to be executed. While the invention is herein shown and described as applied to a rib knitting machine, since such machines present a more difficult problem, certain features of the invention are also applicable to plain knitting machines as will appear from the following description and claims.

The nature, advantages and possibilities of the invention will be more fully understood from the following description and from the accompanying drawings which illustrate typical examples of the new fabric structure and also illustrate a method and apparatus for producing it.

In the drawings,

Fig. 1 is a side elevation of an article of hosiery embodying my invention.

Fig. 2 is a similar side view of the leg portion of an article of hosiery illustrating other patterning possibilities.

Fig. 3 is a diagrammatic representation on a larger scale of the patterned portion of the fabric shown in Fig. 1.

Fig. 4 is a view similar to Fig. 3 but showing a different pattern.

Fig. 8 is a fragmentary perspective view showing a portion of the selective mechanism controlling the feeding of the wrap threads to the needles.

Fig. 9 is a horizontal section taken approximately on the line 9—9 in Fig. 7.

Fig. 10 is a fragmentary vertical section similar to the upper right-hand portion of Fig. 7 but taken at a different angle around the machine, as indicated approximately by the line 10—10 in Fig. 9.

Fig. 12 is a schematic inside developed view of the upper and lower cam blocks showing the cams for actuating the needles.

Fig. 13 is a schematic perspective view illustrating successive steps in wrapping certain needles at one wrapping station.

Fig. 14 is a similar view illustrating successive steps in wrapping certain needles with a different thread at another wrapping station.

Fig. 15 is an enlarged side view of one of the wrap thread feed guides or fingers.

Fig. 16 is a cross-section on the line 16—16 of Fig. 15.

Figure 5:
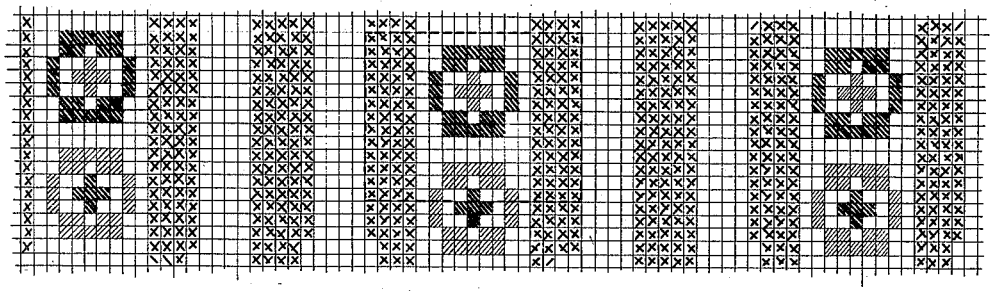
Fig. 5 is a view similar to Fig. 3 but showing the pattern illustrated in Fig. 2.

As coaxial cylinder knitting machines of the general type to which the present invention pertains are known in the art, being illustrated, for example, by the above mentioned patents, the drawings have been simplified by illustrating only the parts that are new and such associated parts as are necessary to a clear understanding of the invention, enabling those skilled in the art to put it into practice.

The article of hosiery shown in Fig. 1 has an anti-ravel top edge or welt W, a top portion R, a leg portion L, a heel portion H, a high-spliced portion HS above the heel, an instep portion I, a sole portion S, a toe-band portion TB and a toe T.

The top portion R is formed of fabric capable of sufficient expansion and contraction to pass over the heel of the wearer without difficulty and yet grip the leg snugly when in place. In its contracted position, the top is preferably narrower than the leg. For example, the top may be formed of 1 x 1 or 2 x 2 rib fabric. Elastic thread may be incorporated in to the top to give it additional stretch and recoverability and to make the sock self-supporting. The upper edge of the top is provided with a suitable selvage or welt W to prevent unraveling or running of the fabric. The edge may, for example, be a single thickness elastic selvage or a tubular welt, preferably with elastic thread incorporated in the welt.

The leg portion L and instep portion I are formed of inwardly facing stitches and outwardly facing stiches arranged to form rib knit fabric, such, for example, as Links-Links fabric or broad rib. In Fig. 1 the fabric of the leg and instep portions is illustrated as 6 x 3 rib fabric except that a broader panel P comprising eleven consecutive wales of outwardly facing stitches is provided on each side of the leg. The fabric of the high-splice portion HS is preferably formed wholly of outwardly facing stitches with or without the incorporation of an additional splicing yarn.

The integral heel portion H and toe portion T are knit by reciprocation of the needle cylinders in usual manner with appropriate narrowing and widening to provide the desired shape. The sole S and circular toe-band TB are preferably formed wholly of outwardly facing stitches. It will be understood that the high-splice portion HS and sole portion S are knit concurrently with the corresponding portions of the instep as tubular seamless fabric.

In the example shown in Fig. 1 the wrap embroidery design is in the form of a clock extending down each side of the leg and into the instep portion. The clocks on opposite sides of the leg are usually alike although they can be different if desired. The pattern is shown diagrammatically on a larger scale in Fig. 3 in which the right-hand portion of the figure is a continuation of the part shown at the left.

In Fig. 3, each of the small squares represents a stitch of the fabric. Inwardly facing or rib stitches are indicated by an $x$ while outwardly facing stitches are shown plain except where they are wrapped. Stitches of wrap thread are shown shaded or cross-hatched. Shading in one direction indicates one color while shading in the opposite direction indicates another color. It will be seen that the wrap pattern is in a panel formed by a group of eleven wales of outwardly facing stitches which are numbered 1 to 11 respectively. This panel is bounded on each side by wales of inwardly facing stitches. The pattern at its widest portion is eleven wales wide so that it thus extends the full width of the panel.

The clock shown in Fig. 3 comprises a head portion 12 extending from the point A to the point B, a neck portion 13 extending from B to C, a shaft 14 extending from C to D and a fork 15 extending from D to E. It will be seen that there is a different pattern in each of the four portions of the clock. This calls for a different sequence and arrangement of the wrap stitches in each successive portion. The clock shown in Fig. 3 illustrates the ability of the invention to make repeating diagonal patterns going in the same direction. It also illustrates how a group of consecutive wales can be wrapped first with one color and then with another, the color of any or all of the wales being changed at will. The color of each wale can be changed as desired independently of any of the other wales. The invention thus makes it possible for the designer to choose as to each individual stitch in each wale whether to use wrap thread of one color or wrap thread of another color or no wrap thread at all. The stitch structure of the fabric and the manner in which the wrap embroidery yarns are incoporated will be understood more fully from the description below in connection with Fig. 6 which shows another embodiment but incorporates the same principles.

Fig. 4 shows another example of a clock pattern embodying the present invention. Here again, the clock comprises a head portion 12, a neck portion 13, a shaft portion 14 and a fork 15, the same reference characters being employed as in Fig. 3.

Fig. 5 illustrates an "allover" pattern that can be made in accordance with the present invention. While only a small section of the fabric has been shown, it will be understood that the pattern is repeated over the leg portion and instep portion of the sock, as illustrated in part by Fig. 2. Figs. 4 and 5 clearly illustrate the color-within-color effects that can be obtained in accordance with the invention. It will be understood that the size, shape and arrangement of the patterns may be varied as desired. The independent control of the color of each wale makes it possible to produce many patterns which were heretofore unobtainable. While, for the sake of simplicity, the patterns have been shown in only two colors, it will be understood that three or more colors may be used if desired.

Figure 6:
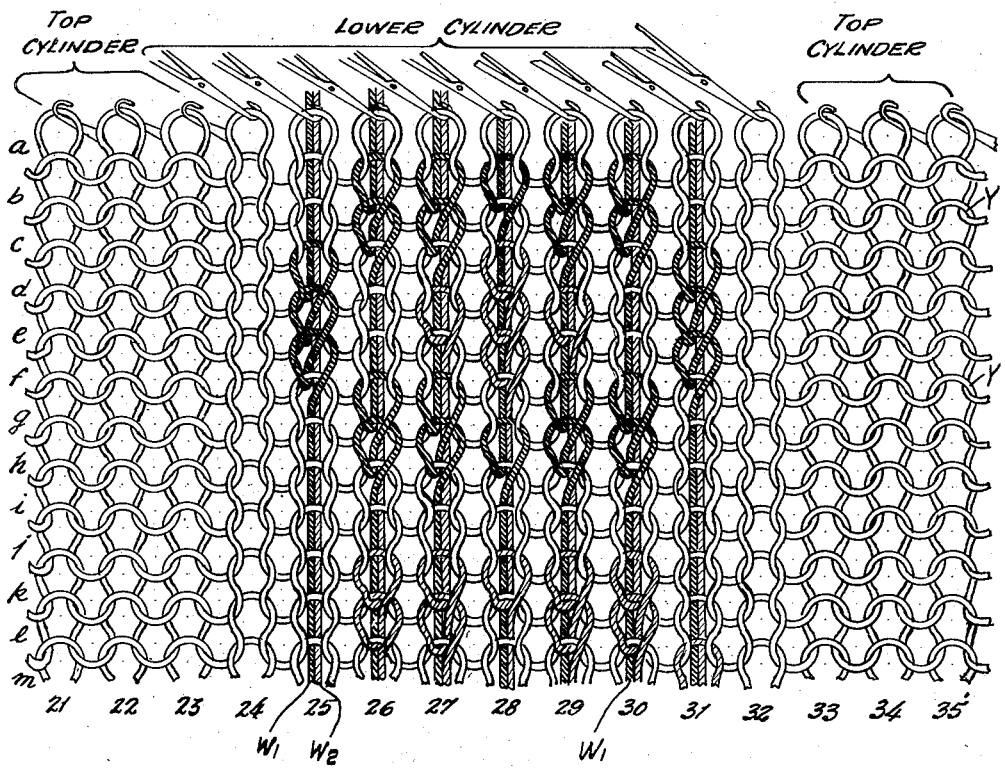
Fig. 6 is a magnified schematic representation of the stitch structure of a small portion of the fabric shown in Fig. 5 as viewed from the outside of the fabric. The area illustrated in Fig. 6 is indicated by broken lines in Fig. 5.

The stitch structure of the fabric is illustrated more clearly in the large-scale stitch diagram of Fig. 6. This figure shows on an enlarged scale a small area of the fabric illustrated in Fig. 5 as indicated by broken lines outlining the area. The courses of the fabric shown in Fig. 6 are lettered $a$ to $m$ respectively while the wales are numbered 21 to 35. Wales 21, 22, 23 and also wales 33, 34 and 35 are formed of inwardly facing stitches knit on top cylinder needles. Wales 24 to 32 inclusive are outwardly facing stitches knit on lower cylinder needles. The body of the fabric is knit of one or more body yarns designated generically by the letter Y. In each of wales 25 to 31 there are two wrap threads which, for convenience in identification, are shaded for green and brown, respectively, and are identified by the characters W1 and W2. At courses $d$, $e$ and $f$ in wale 25, the wrap thread W1 is knitted in plating relation over the body thread Y. In wale 26, the wrap thread W1 is knit at courses $b$, $c$, $g$ and $h$. The wrap thread W1 is knit at the same courses in wale 27 while the wrap thread W2 is knit at course $e$. In wale 28, the wrap thread W1 is knit at course $b$ and course $h$ while wrap thread W2 is knit at courses $d$, $e$ and $f$. As the figure is symmetrical, the other half is the same in reverse. By reference to Fig. 5 it will be seen that the next lower design is of the same shape but that the colors are reversed so that the outer part of the design is formed with wrap threads W2 while the inner portion is formed with wrap threads W1. While the wrap threads in each of the wales 25 to 31 are indicated W1 and W2, respectively, it will be understood that the wrap threads of successive wales need not be alike. For example, the wrap threads used in wale 26 may be of different color or character from the wrap threads used in wale 25. Since there are two separate wrap threads allocated to each wale, the color of each of the wrapped wales can be controlled wholly independently of the other wale. This makes it possible to produce an exceedingly large number of different patterns. Wherever a wrap thread is not knitted, it is floated vertically in its respective wale.

In speaking of the thread or yarn being of different color, the term is used broadly to include any actual or potential difference in appearance. For example, the threads may differ from one another in shade or sheen. Likewise, the threads may be of the same color when knit but of different characteristics so as to respond differently to subsequent dyeing or other treatment. Moreover, the terms "yarn" and "thread" are used generically to include a single strand or a plurality of strands knit together.

Apparatus for carrying out the invention is illustrated in Figs. 7 to 16. The machine shown in the drawings is of the coaxial cylinder type having an upper needle cylinder 40 and a lower needle cylinder 41 which are rotatable and oscillatable in synchronism with one another by suitable driving mechanism. Needles 42 provided with a hook and latch at each end are slidable up and down in alined slots provided in the needle cylinders. The needles are transferable from one cylinder to the other and are operable in either cylinder by means of sliders 43 and 44 having knitting butts and transfer butts engageable with needle operating cams provided in cam boxes 45 and 46. The cams are illustrated in Fig. 12 and described in more detail below. The lower needle cylinder is provided with sinkers 47 operable by sinker cams 48. The upper needle cylinder is provided with verge bits 49 over which inwardly facing stitches are drawn by needles operating in the upper cylinder.

Inside the upper needle cylinder and coaxial therewith is a cylindrical carrier 51 for a plurality of wrap thread guides 52. The thread guides fit snugly into slots provided in the wrap cylinder or carrier 51 which is rotated in synchronism with the upper needle cylinder.

One of the wrap thread feed fingers 52 is shown on an enlarged scale in Figs. 15 and 16. It consists of a body or shank portion 53 carrying at its lower end two projecting arms 54 and 55. The upper arm 54 is longer than the lower arm 55 and is provided at its outer end with a tip portion 56 having one or more perforations or apertures to receive the wrap thread. The lower arm 55 has a similar apertured tip portion 57. As seen in Fig. 16, the tip portions 56 and 57 are inclined in opposite directions to the arms 54 and 55, respectively. The arms 54 and 55 are resilient so as to be swingable relative to the shank portion 53, the axis of swinging movement being approximately parallel to the longitudinal axis of the shank.

At its upper end, the thread guide 52 is provided with a levelling butt 58 and one or more actuating butts 59. In the embodiment illustrated, there are actuating butts at sixteen different levels. The thread guides are preferably made with butts that can be broken off, leaving only such butts as are required to produce the particular wrap embroidery pattern that is set up on the machine. The rear edge of the shank portion 53 is shaped so as to provide a fulcrum 60 approximately midway between the upper and lower ends. The front edge likewise has a fulcrum point 61.

Figure 7:
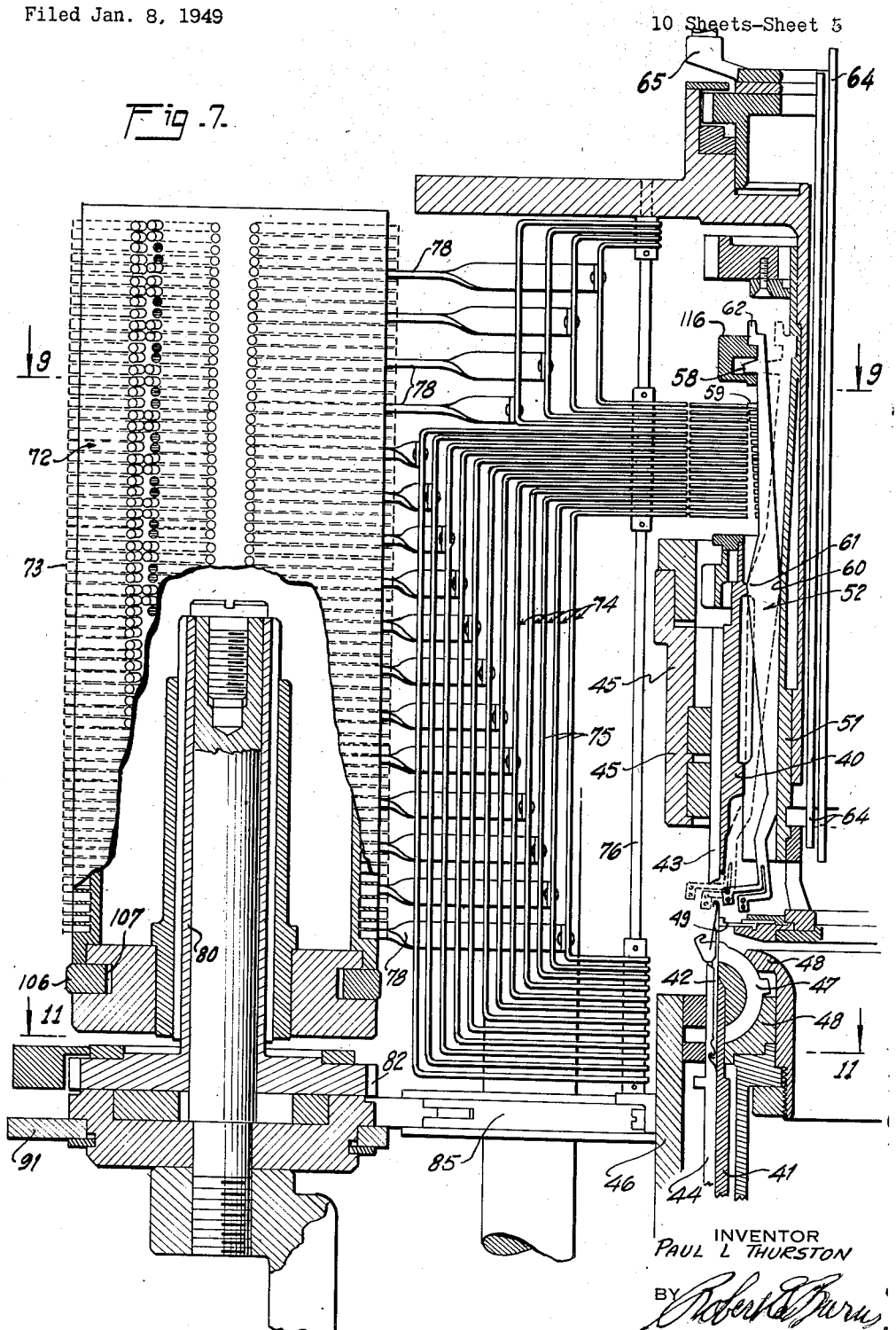
Fig. 7 is a view, partially in vertical section and partially in elevation, of the upper portion of a coaxial cylinder-type circular knitting machine for carrying out my invention, the location of the section being indicated approximately by the line 7—7 in Fig. 9.
Figure 11:
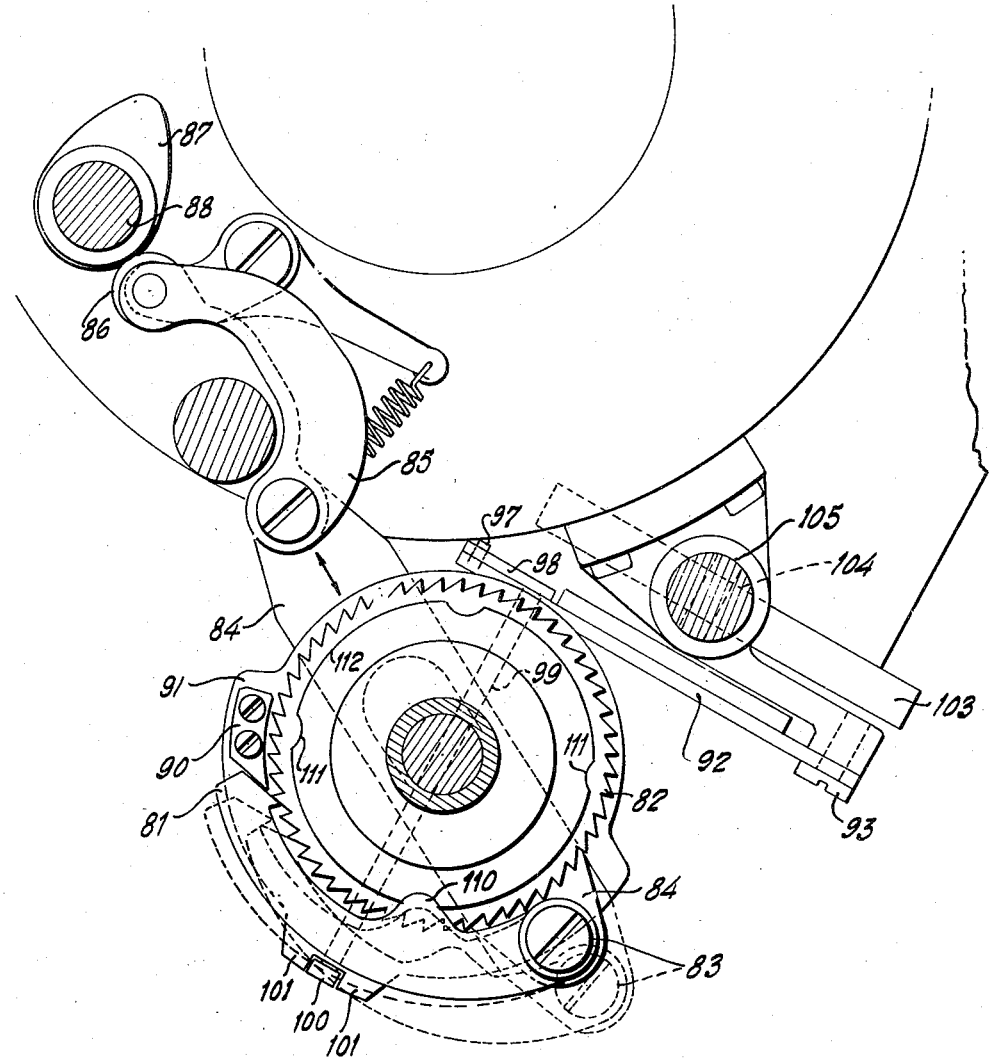
Fig. 11 is a horizontal section taken approximately on the line 11—11 in Fig. 7 and showing racking mechanism for the wrap pattern drum.

One of the wrap thread feed fingers 52 is provided for each of the needles that is to be wrapped. One wrap yarn is threaded through the eye at the tip of arm 54 while another wrap yarn is threaded through the eye at the tip of arm 55 (Fig. 15), the yarns being brought down through guide tubes 64 from reels or cones (not shown) carried on a rack 65 which rotates with the needle cylinders. The lower portion of rack 65 is shown in Fig. 7. The wrap yarn is preferably threaded through the eyes of the two arms from opposite directions, one of the yarns being the wrap yarn W1, as illustrated in Fig. 6, and the other being wrap yarn W2. While in the embodiment illustrated in the drawings the two thread guiding arms 54 and 55 are swingably mounted on the same shank portion 53, they are operable, as described more fully below, in such manner that the corresponding needle can be wrapped either with the yarn carried by arm 54 or, alternatively, with the yarn carried by arm 55. The duplex wrap thread finger 52 thus constitutes in effect two separate thread guides both of which serve the same needle in such manner that the needle can be wrapped with one thread or another as desired, wholly independently of the wrapping of adjacent needles.

The means for selectively actuating the wrap thread guides is illustrated in Figs. 7, 8 and 9. A series of eight selector levers 66 (Fig. 9) are swingable about a vertical post 67 and have nose portions 68 adapted to engage corresponding actuating butts 59 of the wrap thread guides at a wrapping station I, the selector levers being disposed at levels corresponding to the eight upper levels of the actuating butts. A second series of eight selector levers 70 are likewise swingable about post 67 and have nose portions 71 adapted to engage corresponding actuating butts 59 of the wrap thread fingers at a second wrapping station II disposed approximately 90° from the wrapping station I. The levers 70 of the second series are located at levels corresponding to the eight lower levels of the wrap thread finger butts. The selector cams or levers 66 and 70 are both controlled from a single wrap pattern drum 72 which may be of any desired type but is shown in the form of a perforated drum or cylinder carrying a multiplicity of removable pins or cam segments 73. While the pattern drum may, if desired, be mounted so that the pins 73 directly engage portions of the selector levers to swing them inwardly into engagement with the wrap thread fingers, the embodiment illustrated in the drawings utilizes a series of actuating levers 74 for transmitting motion from the pattern drum to the selectors. Each of the actuating levers 74 comprises a U-shaped strap portion 75, the opposite legs of which are perforated to receive a pivot shaft 76. At one end, the leg is extended to provide an arm 77 adapted to engage the corresponding selector lever. The central portion of the U-shaped strap 75 carries a laterally offset arm 78 (Figs. 7 and 9) having a nose portion adapted to be engaged by pins carried by the pattern drum 72. When the nose of the arm 78 rides up on a pin 73, the actuating lever 74 is swung in a clockwise direction (Fig. 9) about the shaft 76 so that the arm 77 presses inwardly on the corresponding selector lever 66 or 70. Each of the selector levers is provided with a spring 79 for withdrawing the lever when there is no pin. While all of the actuating levers 74 are similar to one another and operate in the same manner, they differ in size and shape so as to nest one inside another, as illustrated in Fig. 7. Morever, the arms 77 of the actuating levers for selectors 66 are somewhat longer than those for selectors 70, as illustrated in Fig. 9. With the arrangement shown, the selector levers 66 and 70 can be mounted close together while the pin engaging arms 78 of the corresponding actuating levers 74 are spaced farther apart in order to provide greater pattern selection, as described below.

In the embodiment shown in the drawings, the wrap pattern drum 72 has sixty-four horizontal rows of pins with forty-eight pins in each row. Mechanism is provided for racking the pattern drum one step forward each revolution of the needle cylinder and for moving the pattern drum axially at predetermined intervals so as to bring one or another of the horizontal rows of pins into alignment with the arms 78 of the actuating levers 74. Each actuating lever is controllable by any of four rows of pins, depending upon the axial position of the pattern drum.

The wrap pattern drum is rotatably supported by a post 80 and is racked by means of a pawl 81 engaging ratchet teeth 82 on the drum. The pawl 81 is pivotally mounted at 83 on a slide 84 (Fig. 11) which is reciprocated by means of a link 85 carrying a roller 86 adapted to be engaged by a cam 87 on a counter shaft 88 through which the upper cylinder and wrap thread finger carrier are rotated. As the slide 84 is reciprocated in a lengthwise direction, as indicated by the arrows (Fig. 11), the nose of the pawl engages the teeth of rack 82 to rack the pattern drum. In order to stop the racking of the drum when desired, there is provided a hold-out cam 90 (Fig. 11) carried by a carrier 91 which is oscillatable about the axis of the pattern drum. An arm 92 (Fig. 8) pivotally mounted at 93 and having a cam follower portion 94 adapted to be engaged by links 95 on an auxiliary pattern chain 96 is connected by a link 97 with an arm 98 on a shaft 99 which extends diametrically through the stationary supporting base of the pattern drum and is provided at its opposite end with an upwardly projecting finger 100 which fits between projections 101 on the carrier 91 of the hold-out cam 90. When the cam follower 94 rides up on a high link of the pattern chain 96, the carrier 91 is swung in a counter-clockwise direction, as viewed in Fig. 11, so that the cam 90 holds the pawl 81 out of engagement with the ratchet teeth 82, and prevents the pattern drum from racking. If desired, a similar pawl and hold-out cam are provided on the opposite side of the drum to rack the drum in the opposite direction, in which event the pattern chain 96 has three levels of links to control the direction of rotation, as well as the starting and stopping of the drum as illustrated in my co-pending application Serial No. 133,291, filed December 16, 1949.

The vertical position of the wrap pattern drum is controlled by means of a pattern cam 103 (Fig. 8) which engages a roller 104 on the lower end of a vertically slidable post 105 carrying at its upper end a fork 106, the arms of which engage a corresponding groove 107 (see also Fig. 7) in the pattern drum. The cam wheel 103 is provided with four different levels corresponding to the four vertical positions of the wrap pattern drum. The rotation of the cam wheel 103 is controlled from the main pattern drum or from the auxiliary pattern chain 96 so as to move the wrap pattern drum vertically at predetermined points in the knitting of a sock.

In order to avoid interference between the pins 73 of the wrap pattern drum 72 and the pin-engaging arms 78 (Fig. 9) when the pattern drum is shifted axially, the vertical rows of pins may be sufficiently far apart that the nose of lever 78 is between two pins when the axial shift occurs. By coordinating the timing of the axial shift and the racking of the pattern drum 72, the shift can be effected between pins. Alternatively, the pins can be placed closer together—in order to decrease the diameter of the drum—and wide spaces left only at one or more points where an axial shift of the drum is to be made. As illustrated in Fig. 9, there are four wide spaces 109 located at quarter points around the circumference of the drum 72. At these points the spacing is twice as great as elsewhere. In order to compensate for the difference in spacing of the pins, it is necessary to rack the drum 72 twice as far at the points where the wider gaps 109 occur. This is accomplished by providing on the pawl 81 an inwardly projecting cam lobe 110 (Fig. 11) adapted to engage depressions 111 in a cam disc 112 which rotates with the pattern drum 72. The movement of the pawl 81 is sufficiently great to enable it to rack the drum a distance of two teeth on each reciprocation of the slide 84. However, when the cam lobe 110 is in engagement with the outer periphery of cam disc 112, the pawl is held out so that it misses the first tooth and hence racks the drum only the distance of one tooth. When the cam lobe 110 drops into one of the depressions 111 in the cam disc, the pawl is permitted to engage the first tooth of the ratchet and thereby rack the drum twice as far.

As explained above, the engagement of one of the selector levers 69 with an actuating butt on one of the wrap fingers 52 (Figs. 7 and 9) pushes the upper end of the finger in and rocks the finger about its fulcrum 60 (Fig. 15) so that the lower end swings out at the first wrapping station I. The thread guides are swung back in by a retracting cam 114 (Fig. 10) which engages the upwardly projecting end 62 of the finger, causing it to rock about the fulcrum point 61 (Fig. 15). Likewise, at the second wrapping station II, the wrap finger can be swung out by engagement with one of the selector levers 70 and is retracted by a cam 115. The actuation of the wrap fingers at one or another of the wrapping stations is controlled by the pins in the wrap pattern drum 72 and by the position of one or more actuating butts 59 on the wrap finger. A leveling cam 116 adapted to engage butts 58 of the fingers is provided in advance of each wrapping station to position the fingers at the proper height. Although shown in Fig. 7, the cam 116 is actually ahead of the position at which this section is taken.

In knitting wrap embroidery fabric, the needles are actuated in such manner as to cooperate with the wrap thread guides to take one or another of the wrap threads—except in those stitches where no wrap thread is to be incorporated—and are then actuated to take the body thread and to draw stitches of the body thread and wrap thread, if any. Cams for actuating the needles are shown diagrammatically in Fig. 12. The upper cylinder cam box 45 (Fig. 7) comprises a guard cam 120, a bolt cam 121, guard cam 122, stitch cam 123, partial clearing cam 124 and a bolt cam 125 which serves to block a track 126 through which the slider butts travel during the making of a welt. The cam 125 also serves as a clearing cam. All of these cams work on the knitting butts of the upper cylinder sliders 43. An upper transfer cam 127 is adapted selectively to engage transfer butts of the sliders to transfer needles from the upper to the lower cylinder. The position of the body thread feed is indicated at F.

The lower cylinder cam box 46 (Fig. 7) includes switch cams 130, a draw-down cam 131, a retractable wrap-positioning cam 132, reverse stitch cam 133, center cam 134, forward stitch cam 135, partial clearing cam 136, gate cam 137, clearing cam 138, retractable shedding cam 139 and wrap-positioning cam 140, all working on the knitting butts of the lower sliders 44. A lower transfer cam 141 selectively engages transfer butts of the lower cylinder sliders to transfer needles from the lower to the upper cylinder. There is also a swinging draw-down cam 142, which also works on the lower transfer butts. The various movable cams are controllable by the main patterning mechanism of the machine in usual manner to move them into and out of position, as required, and also to provide suitable needle selection. The individual needle selection may be effected by mechanism similar to that shown in Figs. 7, 8 and 9 acting on jacks to raise selected needles. Group needle selection may be effected by using different lengths of butts on the sliders.

A latch guard 145 carried by the upper cam block is provided with windows 146 and 147 at locations corresponding to the two wrapping stations to permit the wrap thread guides to swing out around the needles, as hereinafter described.

The operation of the machine will be understood from a brief description of the steps for making the article of hosiery illustrated in Figs. 1 and 3. After knitting the welt W and the top R in the usual manner, a selective needle transfer is effected to position the proper needles in the upper and lower cylinders, respectively, to make the rib-knit leg portion. The needles for knitting wales 1 to 11 (Fig. 3) are in the lower cylinder. The wrap pattern drum 72 (Fig. 7) is started racking, the drum being in its highest position so as to bring the lowest of each set of four rows of pins into alignment with the corresponding selector actuating levers 74. The wrap-positioning cams 132 and 140 (Fig. 12) are in operative position to position the needles at the proper levels for wrapping at the respective wrapping stations. The wrapping of selected needles at one or another of the wrapping stations is controlled by the selective cooperation of the needles and the wrap thread guides to form the head portion 12 of the clock shown in Fig. 3. At the first wrapping station the needles that are to be wrapped are positioned at such height by the cam 140 that the tip of the upper wrap thread guide 54 will engage the upper end of the needle when the guide is swung out by one of the selector levers 66 (Fig. 9). Owing to the inclination of the tip portion 56, the guide passes to one side of the needles as it swings out and comes back on the opposite side of the needle so that the wrap thread carried by the guide is looped through the hook of the needle, as illustrated in Fig. 13 which shows successive steps in the wrapping operation. The wrap fingers are retracted by the cam 114 (Figs. 9 and 10). Only those needles are wrapped at the first station which are to receive the wrap thread fed by the upper thread guide 54.

At the second wrapping station, the needles that are to receive the other wrap thread are positioned at the proper level by cam 132 (Fig. 12). These needles are at a lower level than the needles wrapped at the first station so as to be engaged by the tip portions of the lower thread guides 55. Alternatively the wrapping fingers are raised by the levelling cam 115. The wrapping finger 52 is swung out farther at the second wrapping station by engagement of selector levers 70 so as to swing the tip of the lower thread guide around the upper end of selected needles, as illustrated in Fig. 14. Owing to the inclination of the tip portion 57 of the lower thread guide (Fig. 15), the tip passes out on one side of the needle and is then deflected so as to come back on the other side. The needles wrapped at the second wrapping station receive only the thread fed by the lower thread guide 55.

It will thus be seen that any of the needles provided with wrap thread guides can be wrapped with one thread at the first wrapping station or with another thread at the second wrapping station. The wrapping of each needle is independent of the adjacent needles. Consecutive needles or spaced needles can be wrapped as desired.

When the head portion 12 of the clock shown in Fig. 3 is completed, the wrap pattern drum 72 is dropped down one notch so as to bring a second row of pins into alignment with each of the selector actuating levers. These pins can thus be set up to provide an entirely different pattern in the neck portion 13. The wrap pattern drum is again lowered by successive steps at points C and D (Fig. 3) in order to bring successive rows of pins into operation for making the shaft 14 and fork 15. The foot of the sock is knit in usual manner except for the wrapping in the instep portion, the heel and toe being knit by reciprocation of the needle cylinders.

By wrapping each of selected needles with selected wrap thread at one wrapping station and then, in the same course, wrapping each of selected needles with different wrap thread at another wrapping station, the needle selection at the first station being independent of and, for most patterns, different from that at the second an extremely wide range of attractive wrap patterns can be produced. While in the embodiment illustrated in the drawings the two wrap thread guides for each needle are shown as separate arms or yarn fingers on a single body portion of shank, it will be readily understood that the guides may be wholly separated from one another. Still other modifications of the invention within the scope of the annexed claims will be apparent to those skilled in the art.

What I claim and desire to secure by Letters Patent is:

1. An article of hosiery comprising a foot portion having a heel and toe and an integral leg portion formed of tubular seamless fabric composed of body yarn knit to form inwardly facing stitches and outwardly facing stitches arranged in predetermined order and a plurality of wrap yarns extending walewise along each of a plurality of successive wales and knit alternatively at selected stitches of their respective wales.

2. An article of hosiery comprising a foot portion having a heel and toe and an integral leg portion formed of tubular seamless fabric composed of body yarn knit to form inwardly facing stitches and outwardly facing stitches arranged in predetermined order and a plurality of wrap yarns of different color extending walewise along each of a plurality of successive wales and knit alternatively at selected stitches of their respective wales, wrap yarn of one color being knit both above and below wrap yarn of another color in the same wale.

3. An article of hosiery comprising a foot portion having a heel and toe and an integral leg portion formed of tubular seamless fabric composed of body yarn knit to form inwardly facing stitches and outwardly facing stitches arranged in predetermined order and a pair of wrap yarns extending along each of a group of successive outwardly facing wales, one of said wrap yarns of a pair being knit in plating relation over the body yarn at selected stitches in its respective wale and the other wrap yarn of said pair being knit in plating relation over the body yarn at other stitches in said wale.

4. An article of hosiery comprising a foot portion having a heel and toe and an integral leg portion formed of tubular seamless fabric composed of body yarn knit to form inwardly facing stitches and outwardly facing stitches arranged in predetermined order and a plurality of wrap yarns of different color extending walewise along each of a group of successive wales and knit interchangeably at selected stitches of their respective wales, the wrap yarn in one of said wales being changed at one point and the wrap yarn of another of said wales being changed at a different point in the walewise extent of the fabric.

5. An article of hosiery comprising a foot portion having a heel and toe and an integral leg portion formed of tubular seamless fabric composed of yarn knit to form inwardly facing stitches and outwardly facing stitches arranged in predetermined order and having a multi-color wrap embroidery pattern extending over a group of not less than 6 consecutive wales, said pattern being formed by a plurality of wrap threads extending in a walewise direction and knit at selected stitches, there being two different wrap threads knit selectively in each of said wales and the selection in each wale being independent of the selection in any of the other wales.

6. An article of hosiery comprising a foot portion having a heel and toe and an integral leg portion formed of tubular seamless fabric composed of body yarn knit to form inwardly facing stitches and outwardly facing stitches arranged in predetermined order and a plurality of wrap yarns of different color extending walewise along each of a plurality of successive wales and knit alternatively at selected stitches of their respective wales, wrap yarn of one color being knit both above and below wrap yarn of another color in the same wale and also on both sides of said latter wrap yarn in the same course.

7. An article of hosiery comprising a foot portion having a heel and toe and an integral leg portion formed of tubular seamless fabric composed of body yarn knit to form inwardly facing stitches and outwardly facing stitches arranged in predetermined order and a plurality of wrap yarns of different color extending walewise along each of a group of successive wales and knit interchangeably at selected stitches of their respective wales, the wrap yarns in one of said wales being interchanged at selected points in the walewise extent of the fabric while continuing the same wrap yarns in other of said wales without change at said points.

PAUL L. THURSTON.

REFERENCES CITED

The following references are of record in the file of this patent:

UNITED STATES PATENTS

| Number | Name | Date |
|---|---|---|
| 1,965,873 | Wildt et al. | July 10, 1934 |
| 2,065,469 | Kent | Dec. 22, 1936 |
| 2,156,185 | Levin | Apr. 25, 1939 |
| 2,358,640 | Holmes | Sept. 19, 1944 |
| 2,376,246 | Getaz | May 15, 1945 |
| 2,387,253 | Getaz | Oct. 23, 1945 |
| 2,421,817 | Thurston et al. | June 10, 1947 |
| 2,463,751 | Deans et al. | Mar. 8, 1949 |